Oct. 1, 1968          J. C. TURRO          3,403,900
ADJUSTABLE SOLDERING AND ASSEMBLY AID
Filed Oct. 21, 1966          2 Sheets-Sheet 1
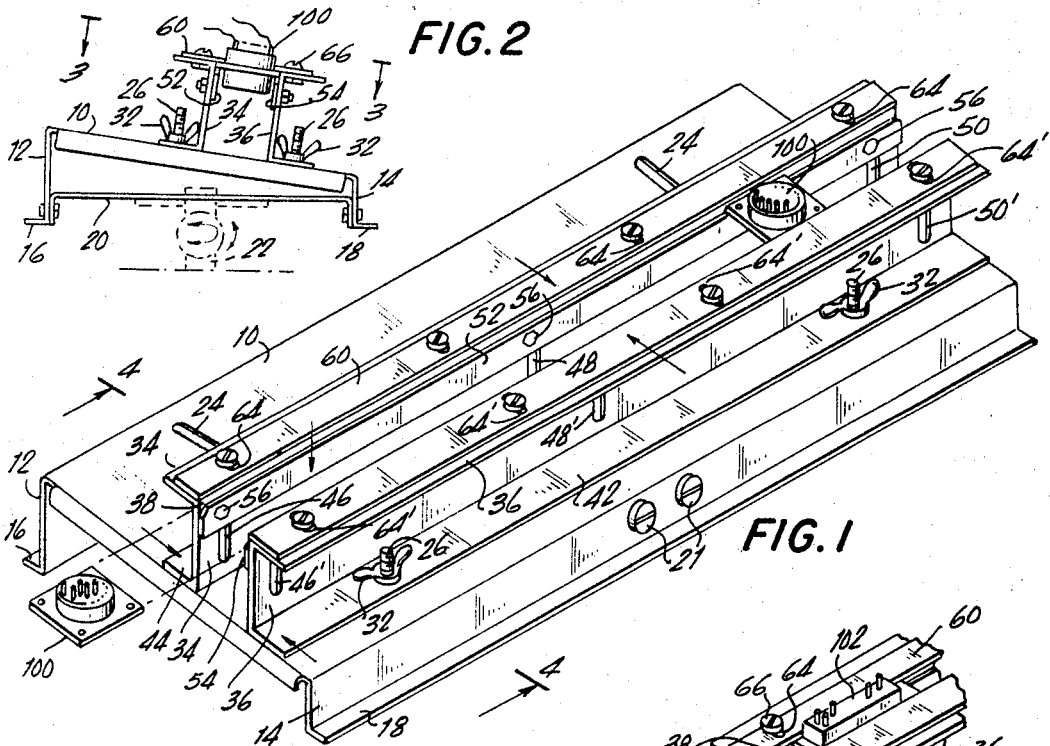
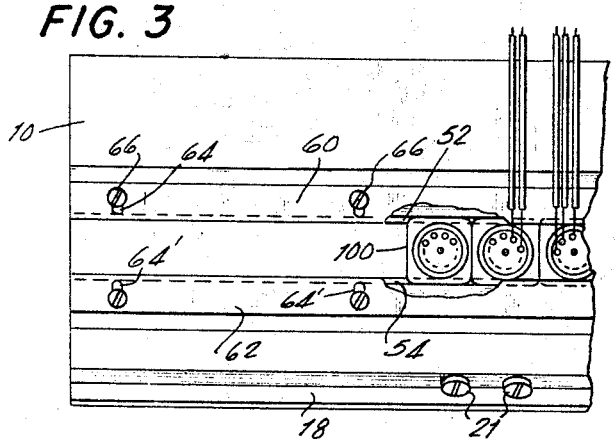
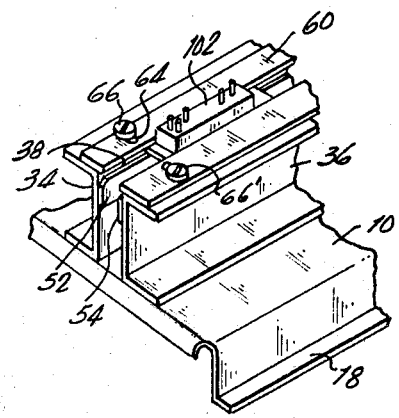
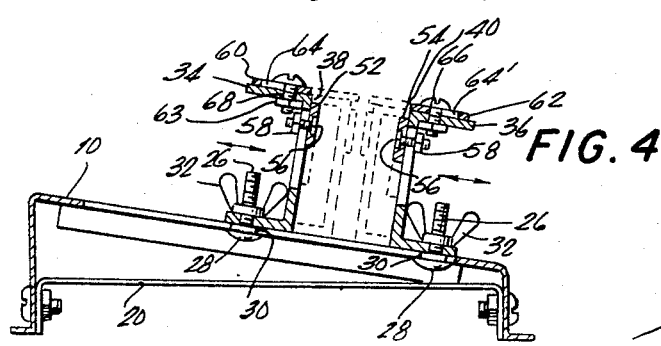
INVENTOR.
JEROME C. TURRO
BY
ATTORNEYS

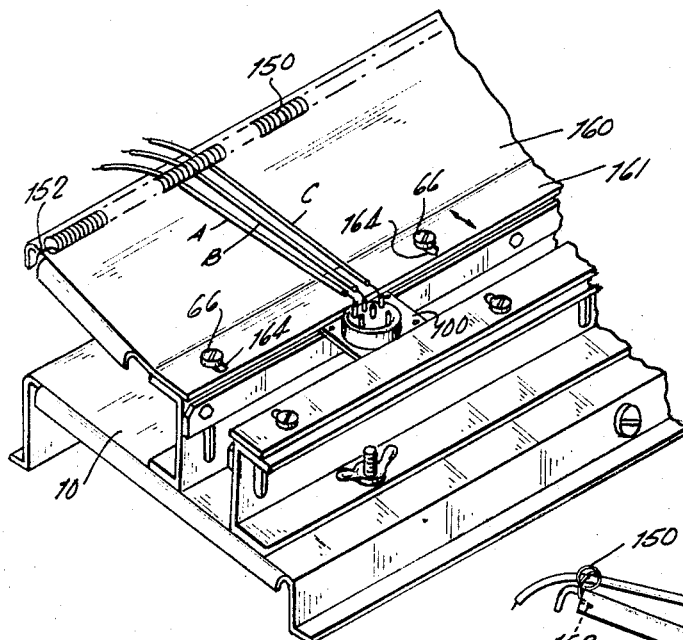
FIG. 6
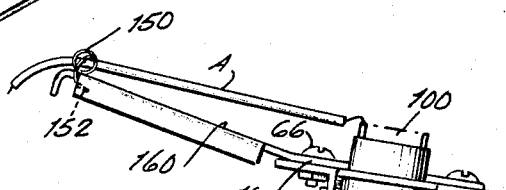
FIG. 7
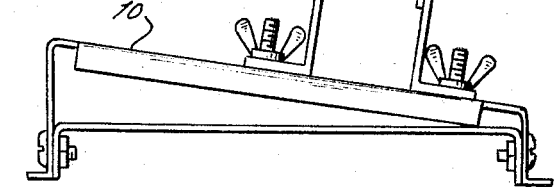
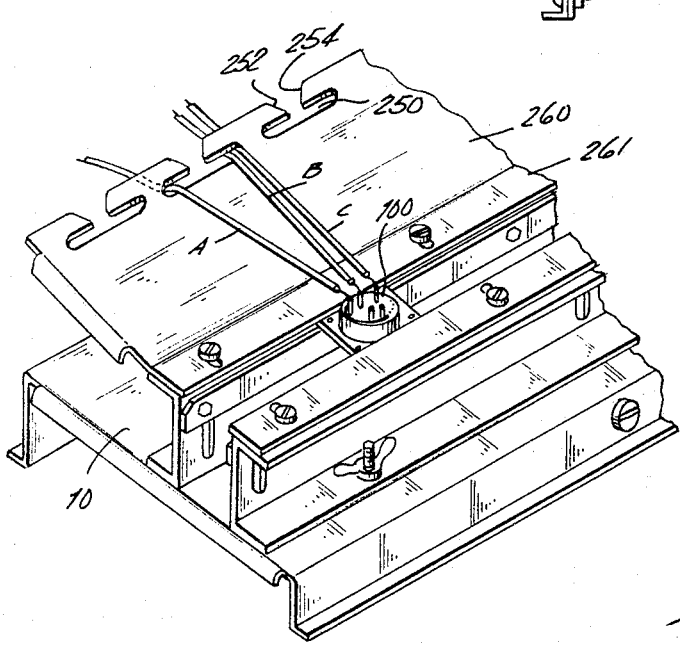
FIG. 8

United States Patent Office 3,403,900
Patented Oct. 1, 1968

3,403,900
ADJUSTABLE SOLDERING AND ASSEMBLY AID
Jerome C. Turro, Yonkers, N.Y., assignor to Siks Manufacturing, Inc., Bronx, N.Y., a corporation of New York
Filed Oct. 21, 1966, Ser. No. 588,566
10 Claims. (Cl. 269—37)

This invention relates to an adjustable soldering and assembly aid, and more particularly to a workpiece holder which is quickly and easily adjustable to grip workpieces of infinite variety of shapes and a large variation in dimensions during operations such as soldering of wires to the workpiece and during other types of electrical and mechanical assembly operations.

It is therefore an object of this invention to provide a labor and time-saving device for holding workpieces, which device is adjustable in height and in width for holding a plurality of workpieces in alignment at a convenient working location and angle.

A further object of the invention is to provide a workpiece holder which is quickly and easily adjustable requiring a minimum of tools to adjust it for receiving and clamping a large number of shapes and sizes of workpieces.

A further object of the invention is to provide a workpiece holder which can be changed from horizontal to vertical or inclined position for convenience of the operator with a minimum of adjustment or tools.

A further object of the invention is to provide an adjustable workpiece holder which can be conveniently stored in a minimum of space.

Still another object of the invention is to provide a workpiece holder which has provision for supporting loose wires during assembly or soldering of the wire to the workpiece, without the wire holder damaging or pinching the wire insulation.

To these ends, and in accordance with one feature of the invention, a workpiece holder is provided with an inclined base member on which are mounted a pair of extruded channels which are slidable forwardly and backwardly on the inclined base member and which can be fastened thereto in a selected adjustable position parallel to each other, with the distance between them being adjustable by means of wing nuts. Either one or both of the channels carries, on its upper face, a flat bar which is adjustable forwardly and rearwardly relative to the inner edge of the channel. Moreover, the upstanding inner face of each channel carries an upstanding rail of rectangular cross section which is adjustable by means of slots and bolts in an upward and downward direction. The flat bars cooperate with the channels and with the upstanding rails to define either a longitudinal slot between the flat bar and the upstanding rail, which slot can receive the lateral protrusions of the workpiece and clamp its upper and lower edges. Alternatively, the longitudinal slots on the respective front and rear channels can lie in different planes by suitable adjustment of the rails and flat bars.

According to a modification of the invention, the rear flat bar is replaced by a wire-holder surface which has a portion thereof upwardly inclined and which has a coil spring extending horizontally along the rear portion of its upper surface. The forward part of the wire-holder surface is adjustable forwardly and rearwardly in a manner similar to the rear flat bar which it replaces, and opposed to the flat bar on the upper surface of the forward channel. The spring serves to grip and space individual wires between coils of the spring, without unduly pinching the insulation.

According to a further modification of the invention, instead of a coil spring as in the first modification, wire-holding means comprising a plurality of inverted T-shaped slots are cut into the rearward edge of the wire-holding surface, which slots serve to receive the loose wires without any pinching action on the insulation whatsoever.

The foregoing and other objects, advantages and features of this invention will become more apparent from the following description when considered in connection with the accompanying drawings in which:

FIG. 1 is a perspective view of one embodiment of this invention, showing one type of connector workpiece gripped therein and another of the same type ready to be inserted;

FIG. 2 is an elevation end view of the device of FIG. 1, with the illustrated connector workpiece in position, and also showing schematically a universal joint supporting the device from below;

FIG. 3 is a fragmentary plan view of the device of FIGS. 1 and 2, partially cut away, with typical wires shown soldered to two of the three connector workpieces illustrated;

FIG. 4 is a composite cross section taken along the plane of line 4—4 and through other various slotted adjustments, with another position of the channels shown in phantom lines;

FIG. 5 is a fragmentary view of a detail of the last end of the device of FIG. 1, showing a different type of workpiece connector clamped in position in the device;

FIG. 6 is a fragmentary perspective view of a modification of the device of FIG. 1;

FIG. 7 is an end view of the device of FIG. 6;

FIG. 8 is a fragmentary perspective view of a further modification of the device according to the invention.

In the drawings the same numerals are used to designate the same or functionally similar parts throughout the several views.

In FIG. 1, the numeral 10 designates an inclined base member having a rear support 12 which is somewhat longer than the front support 14, so that the surface of the base number 10 makes an angle of about 15 degrees with the horizontal. The supports 12, 14 each have respective foot flanges 16, 18 extending along their entire lengths and which serve to rest the device on a table or fit into suitable racks (not shown) for convenient and space-saving storage. A bracket 20, bolted by bolts 21 or otherwise joined to supports 12 and 14 not only reinforces the base member, but also serves as a location for affixing a universal joint 22 (FIG. 2) which permits manually moving and fixing the device in any desired position, namely horizontal, vertical or tilted in any desired plane.

The upper face of the base member 10 is provided with parallel transverse slots 24, 24 through which carriage bolts 26, 26 protrude with their round headed portions 28, 28 on the bottom side of the top surface of base member 10 and the square portions 30, 30 fitting snugly but slidably into the slots 24, 24 to prevent rotation of the bolts 26, 26 when the wing nuts 32, 32 are rotated thereon. Thus, no screwdriver or wrench is required for loosening or tightening the wing nuts 32 and bolts 26.

Supported by the upper surface of base member 10 and adjustably affixed thereto by means of carriage bolts 26 and wing nuts 32, are two extruded channel members 34, 36. The rear channel member 34 as well as the front channel member 36 are both preferably made of aluminum with sharp rather than rounded corners, for example at 38 and 40 (FIG. 4), so as to define better gripping edges for the workpieces.

The channel members 34, 36 each have two holes in their toe portions 42, 44, said holes being spaced apart the same distance as the transverse slots 24, 24 in the base member 10 and of a diameter so as to receive the threaded ends of carriage bolts 26, 26. The upright web portions of the channel members 34, 36 each are provided with three vertical slots 46, 48, 50 and 46′, 48′ and 50′, respectively. Adjustably bolted to the inner faces of the web portions of channels 34, 36 are respective rails 52, 54. Three hexagonal head studs 56, 56, 56 are pressed into each of the rails 52, 54 so that the heads remain flush with the inner surface of the rail and the threaded bolt portion protrudes into the respective slots 46, 48, 50 or 46′, 48′, 50′, where they are fastened by means of lock washers and nuts 58, 58. The upper end corners of the rails 52, 54 are cut off at an angle of approximately 45 degrees to facilitate insertion of the workpieces onto the upper edges of the rails without causing damage to the workpieces.

The rails 52, 54 may also be provided with a projecting L-shaped lip portion (not shown) where required for supporting off-set pieces.

Adjustably bolted to the upper flange of each of the channels 34, 36 is a respective hold-down flat bar 60, 62, each provided with a plurality of transverse slots 64, 64, 64, 64 and 64′, 64′, 64′, 64′. Screws 66 and 66′ passing through the respective slots 64 and 64′ into holes 68 and 68′ in the upper flanges of the channel members 34 and 36, engage square nuts whose inner edges bear against the wall of the web portion of each channel 34, 36, so that no wrench or other tool is necessary to hold the nut when the heads of the screws 66 and 66′ are rotated by a screwdriver to loosen or tighten them in order to shift or clamp down the hold-down bars 60, 62.

The device of FIGS. 1–5 may be used as follows. The device can either rest on a work table with the flanges 16, 18 being supported directly on the table, or the device is supported on and clamped into the universal joint 22 fastened to the bracket 20. A plurality of similar workpieces 100 (FIGS. 1, 3) or 102 (FIG. 5) or of any other type, are inserted into the longitudinal slots formed between the rail 52 and hold-down bar 60 at the rear channel, and rail 54 and hold-down bar 62 on the front channel. The wing nuts 32 are loosened for forward or backward movement of the channels 34, 36 along transverse slots 24 to obtain the proper distance between the parallel channel members. The four wing nuts 32 are then tightened onto their respective carriage bolts 26. The rails 52 and 54 are then adjusted to the proper level in respective slots 46 and 46′ by means of a socket wrench on nuts 58. If the workpiece happens to have a protruding edge or angular support on one side which lies in a different plane from the protruding edge or support on the other side thereof, the upper surface of rail 54 can be adjusted to lie in a different plane from the upper surface of rail 52, by means of nuts 58 and studs 56. In the type of workpiece illustrated in FIGS. 1 and 3, the lateral protrusions of the workpiece on which they are supported all lie in the same plane, so that the upper edges of the rails 52 and 54 will be adjusted to lie aligned opposed to each other, as best shown in FIG. 4. When the plurality of workpieces 100 are aligned in the space between the front and rear channel members 34, 36 along the entire length of the workpiece holder, the hold-down bars 60, 62 are slid forwardly and rearwardly, respectively, in the direction of the arrows of FIG. 1 so that they overlap the flange portion of the workpiece, and are then bolted down by means of screws 64 and 64′, tightened only by a screwdriver, since the square nut 63 on the lower surface of the top flange of the channel member engages the web portion of the channel members when the screw 66, 66′ is turned.

Soldering or assembly operation can then proceed rapidly on a mass production basis. For example, in FIG. 3 the left workpiece has the customary male or female contacts each designated with a letter, as is customary. The first soldering operation might include soldering a wire of an appropriate color to all of the A contacts of each workpiece in the work holder. When all of the A contacts on all of workpieces in the work holder are completed, the same operator, or a different operator further along the production line, performs a successive operation, such as soldering a wire of different colors to the B or to the C contacts, until all of the many contacts have their respective wires soldered to them.

In this manner fewer errors are made by the operator, and tests have shown that a labor saving in time of from 12 to 40 percent can be achieved.

The workpiece holder according to the invention can be used for mechanical assembly either with or without soldering, for assembly of bus wires, for assembly of resistors, capacitors, either large or miniature, and containing either male or female connectors, or terminal boards, or printed circuit boards, or other mechanical packages. The workpieces may be square, round, rectangular or hexagonal. The workpiece flanges which are used to support the workpiece in the holder may be in the same plane or off-set from the front in relation to the back thereof. This only requires an adjustment in the support rails. The top hold-down bars are adjustable from the front to the rear so that they can overlap the workpiece the required amount in each respective case.

Among the advantages of the device according to the invention are that fewer errors result and the quality of production increases. Less damage is incurred in the workpieces and in the wires being attached thereto, and less fatigue is experienced by the operator. The unit can be placed on a conveyor belt which stops a predetermined length of time, for example one minute, at each station to permit the operator to solder the one or several wires assigned to that operator.

For storage purposes a rack (not shown) may be provided with a track for receiving the flanges 16 and 18.

In the modification of FIGS. 6 and 7, the holddown bar 60 of the device of FIGS. 1–5 is replaced by a member 160 which has a front portion 161 acting in substantially the same manner as bar 60. The portion 161 is provided with slots 164 through which screws 66 extend to engage square nuts 63. Member 160 has an upwardly slanting surface, inclined somewhat greater than the 15 degrees of the base member 10 for supporting the wires A, B, C (FIG. 6) during operation on the workpiece, such as soldering. To help keep the wires in position, a coil spring 150 is fastened along the upper rear portion of the support 160 by means of the spring ends 152 hooked at each lateral side of the wire supporting member 160. In operation, the wires A, B, C are lightly pressed down between the coils of the wire 150 in order to keep them in place.

The device of FIG. 8 is similar to that of FIG. 7 except that, instead of the wire holder means being a spring 150 as in FIGS. 6 and 7, the wires are held loosely in an inverted T-shaped slot 250, the entrance corners 252, 254 forming the entrance to the leg of the inverted T preferably making an angle of 45 to 60 degrees to facilitate insertion of the wires rapidly, which are then easily placed at one of the ends of the T-slot from which they cannot slip out by themselves. The latter modification is especially suitable to meet NASA specifications which require that the insulation on the wires not be pinched or damaged in any manner.

It will be obvious to those skilled in the art, upon studying this disclosure, that devices according to my invention can be modified in various respects and hence may be embodied in apparatus other than as particularly illustrated and described herein, without departing from the essential features of my invention and within the scope of the claims annexed hereto.

I claim:

1. A workpiece holder comprising a base member having a plurality of transverse slots, a pair of channel members movable relative to said base member in the direction of said transverse slots, fastening means associated with said slots for adjustably fastening said channel members to said base member, said channel members each carrying a bar member and an upstanding rail member, and adjusting means for adjustably attaching said bar members and said rail members to said channel members for supporting workpieces relative to said channel members.

2. A workpiece holder according to claim 1, said base member being inclined upwardly toward the rear thereof.

3. A workpiece holder according to claim 1, said base member being provided with a bracket having a universal joint for setting said base member to various selected planar positions.

4. Apparatus according to claim 1, said channel members having toe portions provided with openings aligned with said transverse slots, said fastening means having a portion passing through said openings and through said transverse slots, said channel members having mutually opposed web members each provided with a plurality of vertical slots, said adjusting means including flush studs extending from said rails through said vertical slots.

5. Apparatus according to claim 4, said bar members being provided with a plurality of slots extending in a direction parallel to said transverse slots in said base member, said adjusting means including means extending through said transverse slots in said bar members and through said channel members.

6. Apparatus according to claim 1, one of said bar members having an inclined rearward extension surface, said extension surface being provided with wire supporting means.

7. Device according to claim 6, said wire supporting means comprising a coil spring supported by said rearward extension surface.

8. Device according to claim 6, said wire supporting means comprising an inverted T-shaped slot in said rearward extension surface.

9. Device according to claim 1, said fastening means including carriage bolts non-rotatably slidable along said transverse slots.

10. Device according to claim 1, said adjusting means including a nut having a flat upstanding face non-rotatably positioned against one of said channel members.

References Cited

UNITED STATES PATENTS

| | | | |
|---|---|---|---|
| 410,414 | 9/1889 | Hall | 269—45 |
| 1,085,998 | 2/1914 | Sherlock | 101—381 |
| 2,669,774 | 2/1954 | Mitchell | 269—40 |
| 3,193,107 | 7/1965 | Pilat | 248—311 X |

ROBERT C. RIORDON, *Primary Examiner.*

J. F. McKEOWN, *Assistant Examiner.*